(12) United States Patent
Segaram

(10) Patent No.: US 11,447,331 B2
(45) Date of Patent: Sep. 20, 2022

(54) INFUSION PACKAGE AND ASSEMBLY

(71) Applicant: Steve Segaram, Westmead (AU)

(72) Inventor: Steve Segaram, Westmead (AU)

( * ) Notice: Subject to any disclaimer, the term of this patent is extended or adjusted under 35 U.S.C. 154(b) by 0 days.

(21) Appl. No.: 14/767,152

(22) PCT Filed: Feb. 11, 2014

(86) PCT No.: PCT/AU2014/000108
§ 371 (c)(1),
(2) Date: Aug. 11, 2015

(87) PCT Pub. No.: WO2014/121347
PCT Pub. Date: Aug. 14, 2014

(65) Prior Publication Data
US 2015/0368034 A1    Dec. 24, 2015

(30) Foreign Application Priority Data
Feb. 11, 2013 (AU) ................. 2013100144

(51) Int. Cl.
| | | |
|---|---|---|
| *B65D 85/80* | (2006.01) | |
| *B65B 29/02* | (2006.01) | |
| *B65B 61/20* | (2006.01) | |
| *B65D 85/812* | (2006.01) | |
| *A47J 31/06* | (2006.01) | |
| *B65D 85/808* | (2006.01) | |
| *A47G 19/16* | (2006.01) | |

(52) U.S. Cl.
CPC .......... *B65D 85/812* (2013.01); *A47G 19/16* (2013.01); *A47J 31/06* (2013.01); *B65B 29/02* (2013.01); *B65B 29/028* (2017.08); *B65B 61/20* (2013.01); *B65D 85/808* (2013.01); *Y02W 90/10* (2015.05)

(58) Field of Classification Search
CPC .. B65D 85/812; B65D 85/808; B65D 85/804; B65D 85/8043; B65D 85/816; B65D 85/8046; B65D 85/8061; B65B 29/02; B65B 29/04; B65B 61/20; B65B 29/028; A47G 21/04; A47G 19/16; A47J 31/06; A47J 31/0636
See application file for complete search history.

(56) References Cited

U.S. PATENT DOCUMENTS 1,677,397 A * 7/1928 Mock .................. B65D 85/808
40/324
4,828,850 A * 5/1989 Davis ..................... A47J 31/02
206/0.5
(Continued)

FOREIGN PATENT DOCUMENTS

JP          7-227357 A        8/1995
WO   WO-2007003009 A1 *  1/2007  ............. A47G 19/16

OTHER PUBLICATIONS

International Search Report for corresponding International Patent Application No. PCT/AU2014/000108 dated Apr. 23, 2014.

*Primary Examiner* — Ericson M Lachica
(74) *Attorney, Agent, or Firm* — Merchant & Gould P.C.

(57) ABSTRACT

An infusion package is disclosed comprising a permeable membrane defining an elongate cavity to hold an infusible material; and at least one rigid member extending longitudinally along at least a portion of the cavity such that the rigid member is retained by at least a portion of the permeable membrane.

10 Claims, 13 Drawing Sheets

(56) References Cited

U.S. PATENT DOCUMENTS

| | | | | |
|---|---|---|---|---|
| 4,983,410 | A * | 1/1991 | Dinos | B65D 85/8043 426/110 |
| 5,478,581 | A * | 12/1995 | Christie | B65B 29/028 426/80 |
| 5,809,868 | A * | 9/1998 | Milone | B65D 85/8085 99/279 |
| 5,866,185 | A * | 2/1999 | Burkett | A47G 21/004 206/0.5 |
| 2001/0035417 | A1 * | 11/2001 | Kantor | B65D 41/26 220/592.17 |
| 2003/0113411 | A1 * | 6/2003 | Rose | B65D 85/808 426/77 |
| 2004/0131729 | A1 * | 7/2004 | Helprin | B65D 85/808 426/77 |
| 2004/0261370 | A1 | 12/2004 | Rea et al. | |
| 2005/0263006 | A1 * | 12/2005 | Saha | A47G 19/16 99/275 |
| 2008/0063754 | A1 * | 3/2008 | Kuo | B65D 85/808 426/81 |
| 2008/0165008 | A1 * | 7/2008 | Mercier | G08B 13/2445 340/572.1 |
| 2008/0171110 | A1 * | 7/2008 | Stuart | B65D 85/812 426/82 |
| 2009/0301903 | A1 * | 12/2009 | Andersson | B65D 75/5833 206/215 |
| 2011/0272302 | A1 * | 11/2011 | Pagan | B65D 81/3283 206/222 |

* cited by examiner

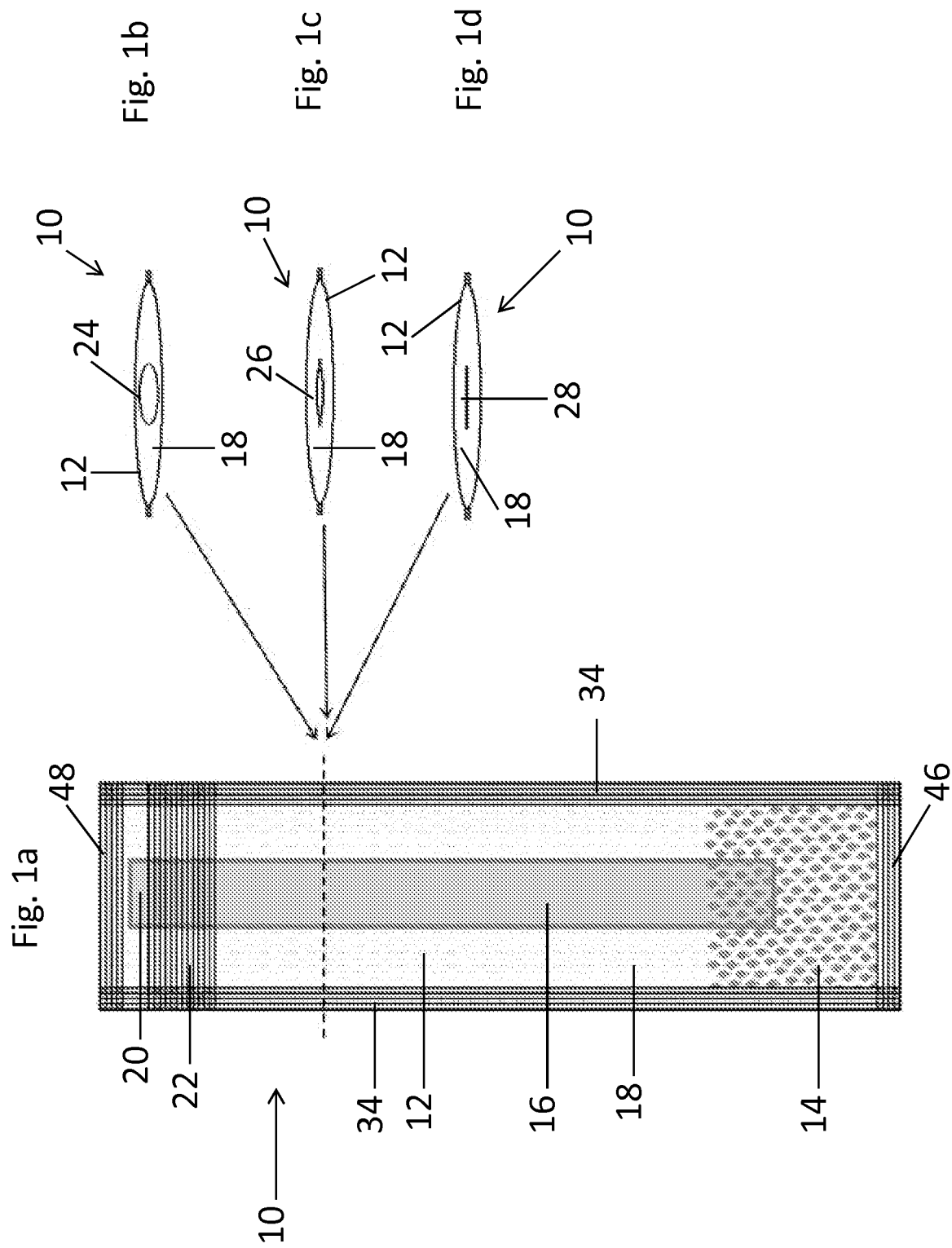

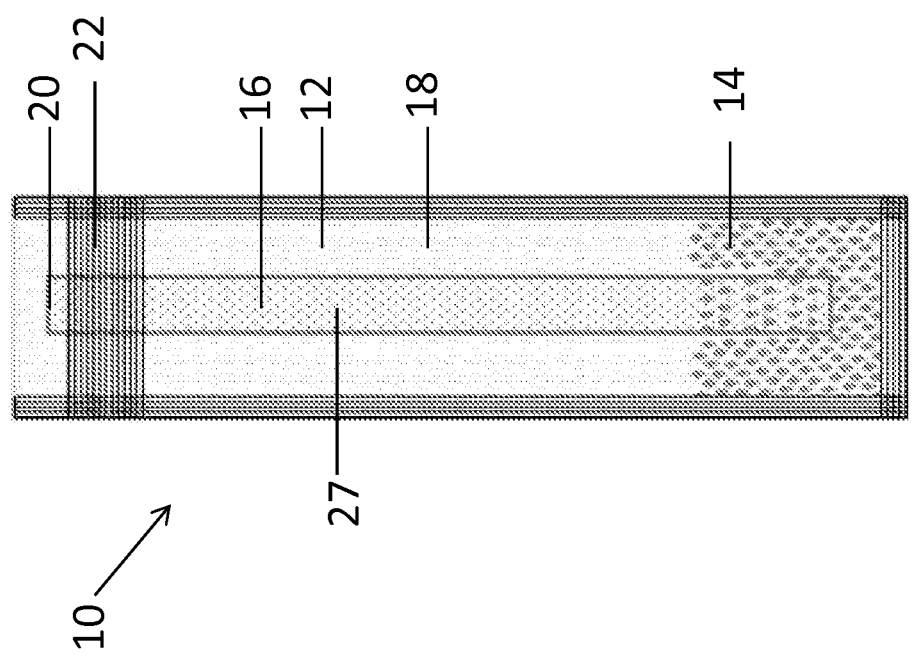

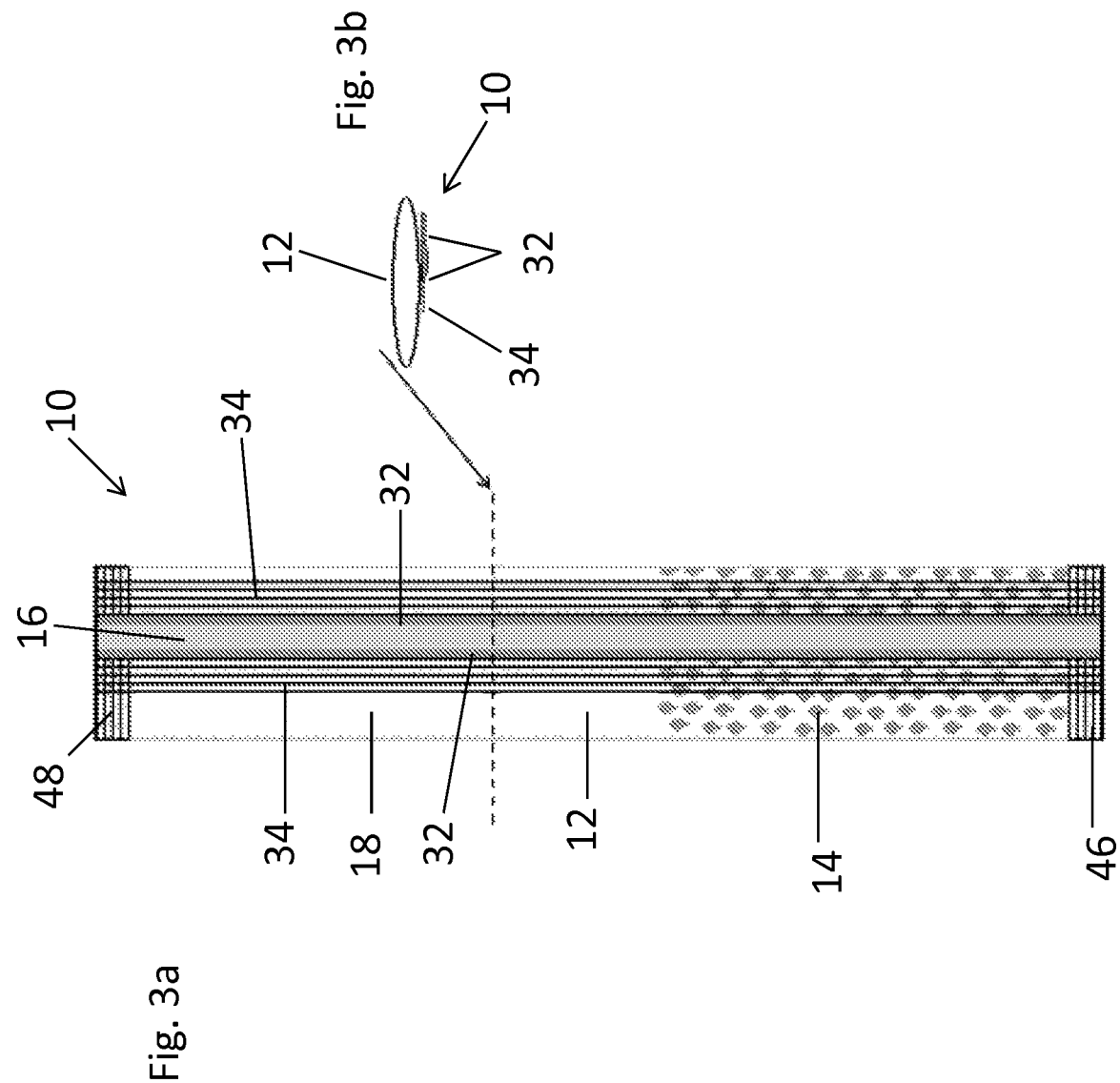

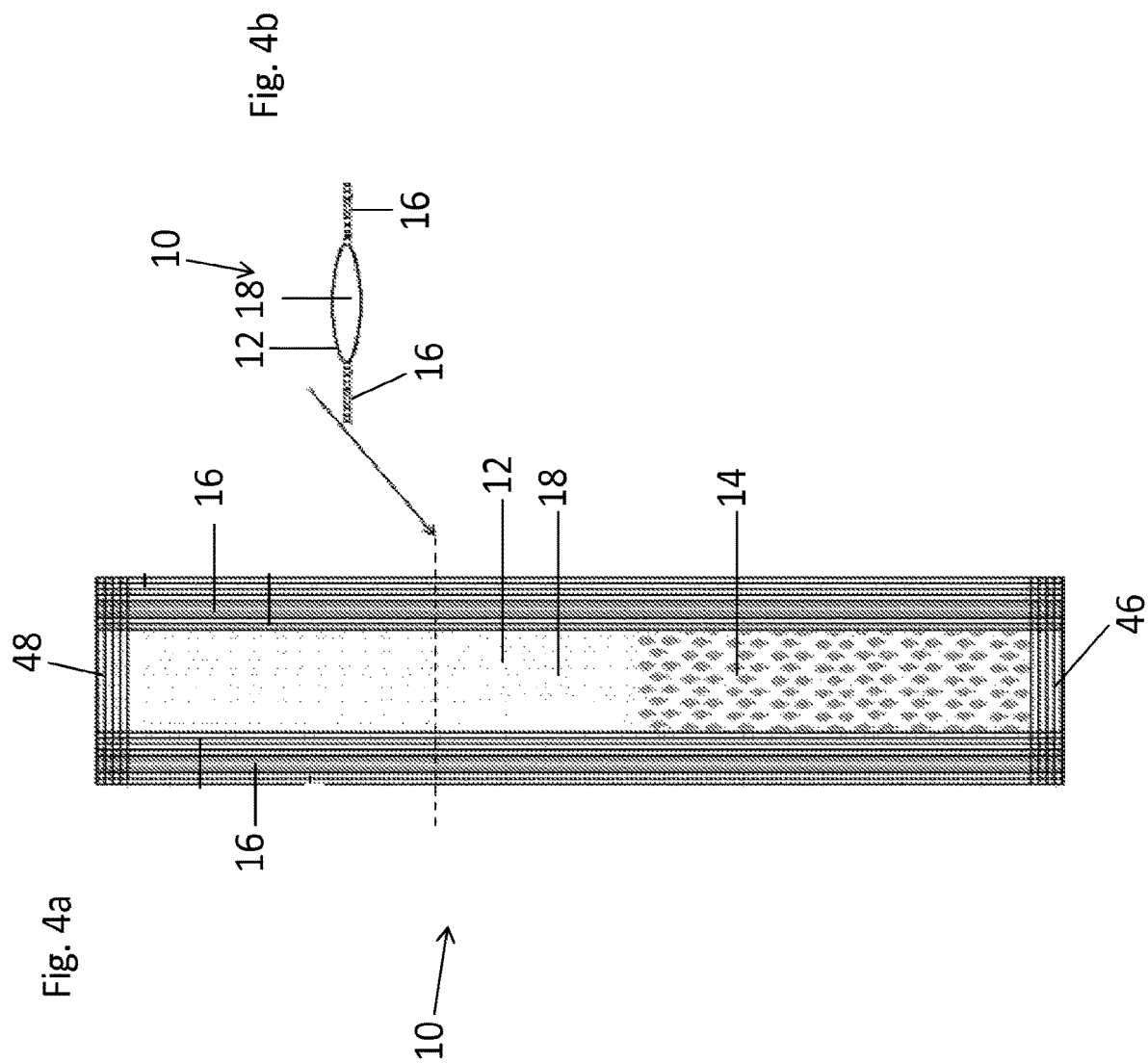

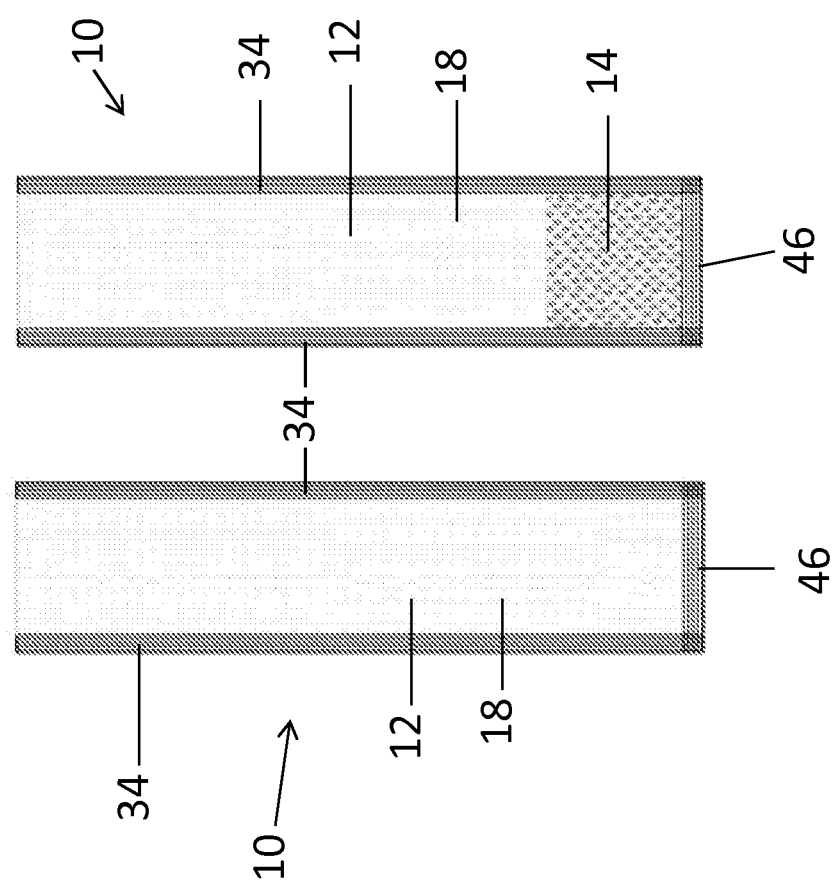

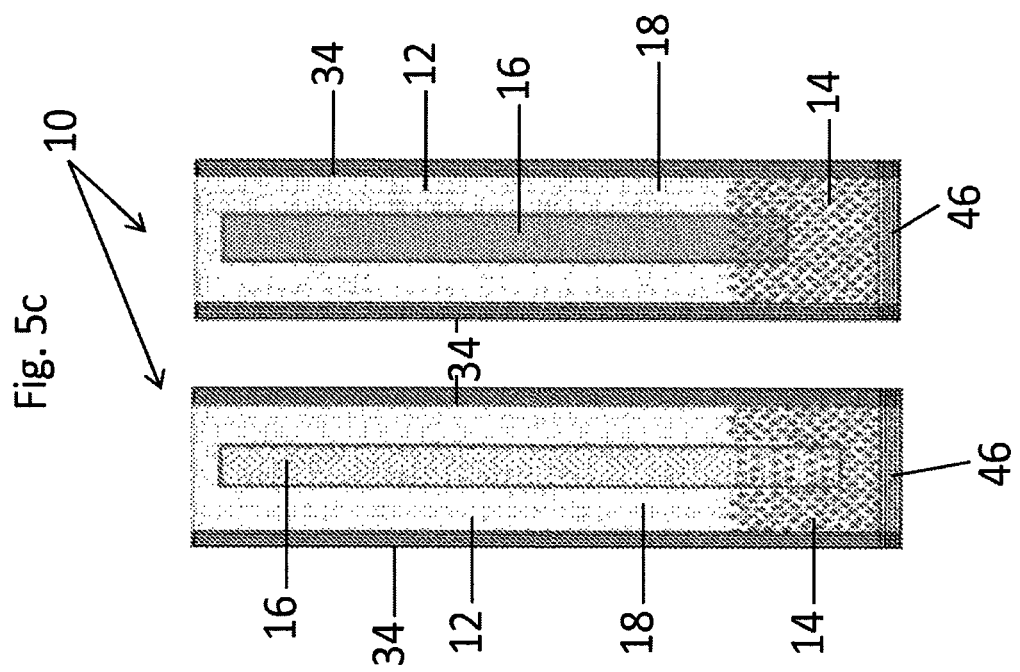

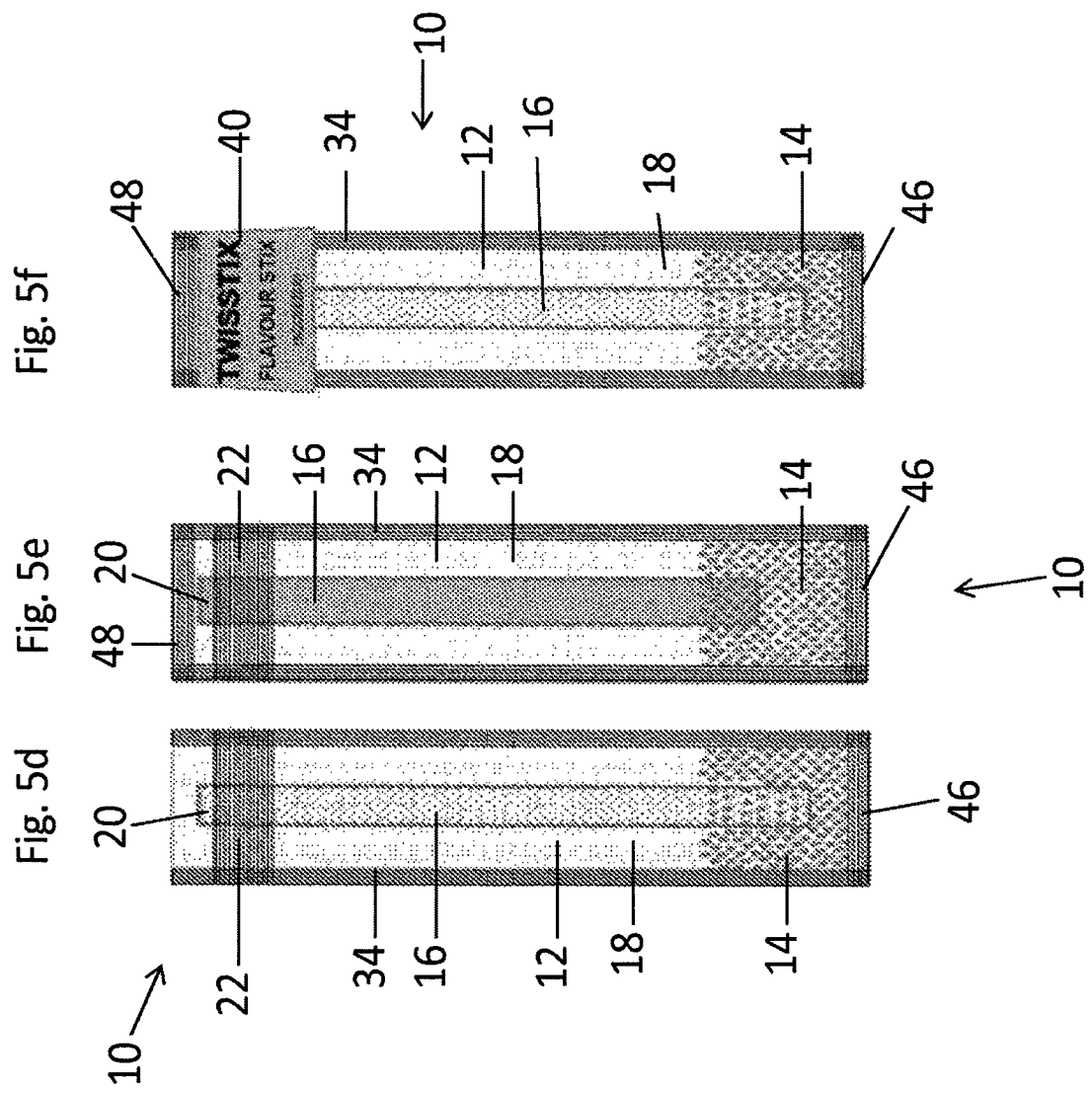

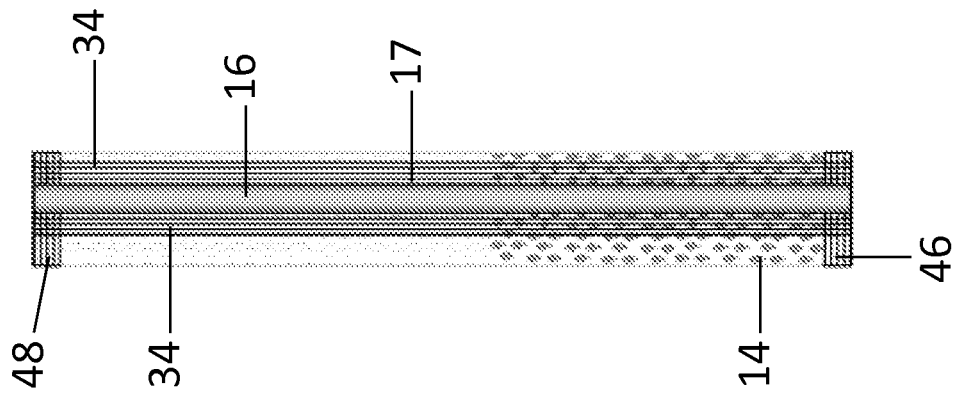
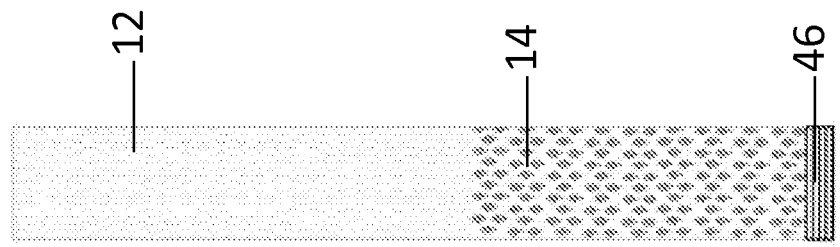
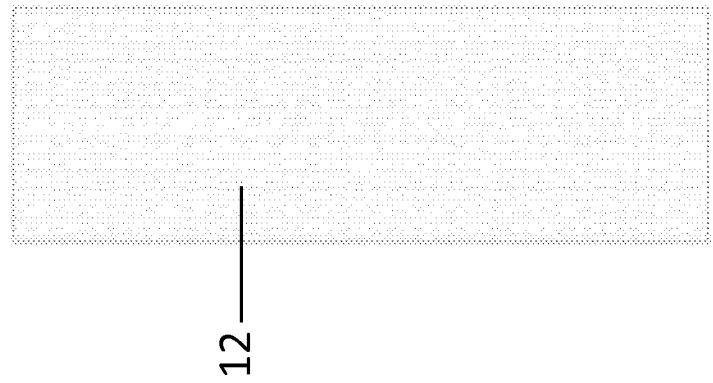

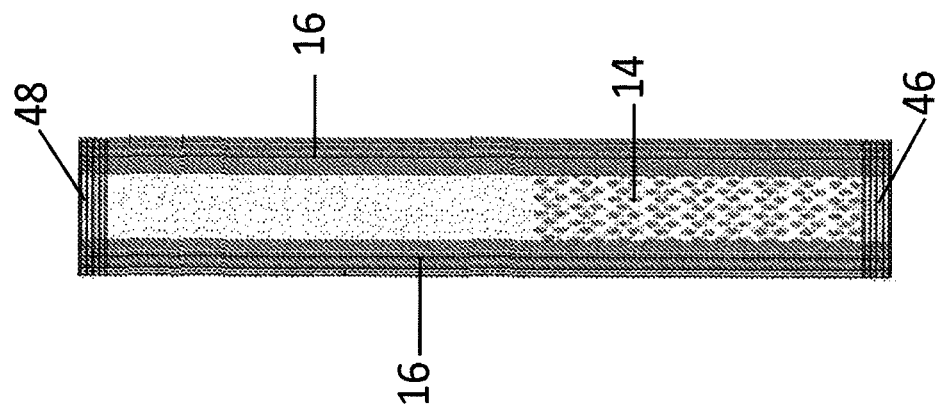
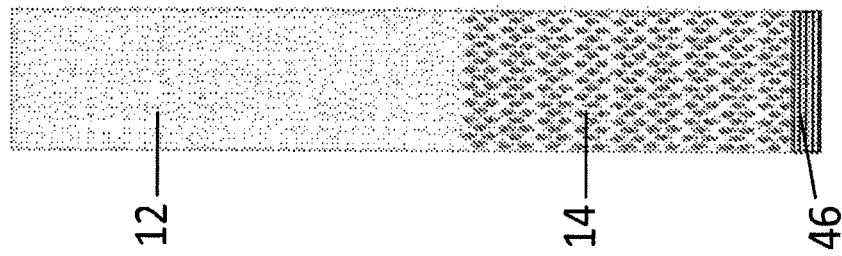
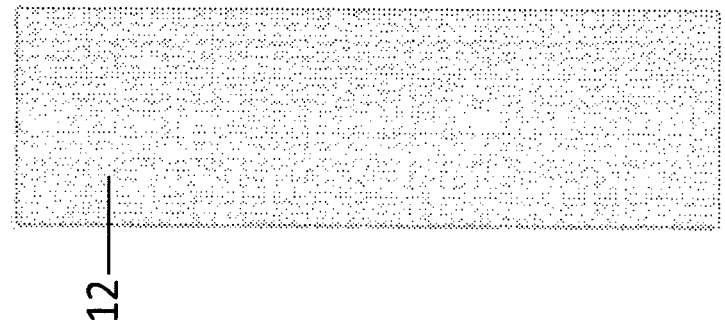

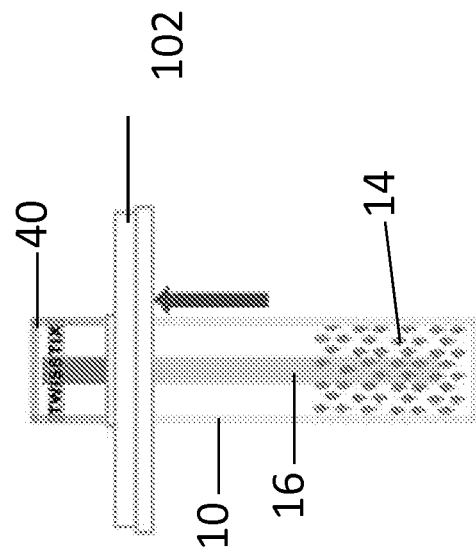
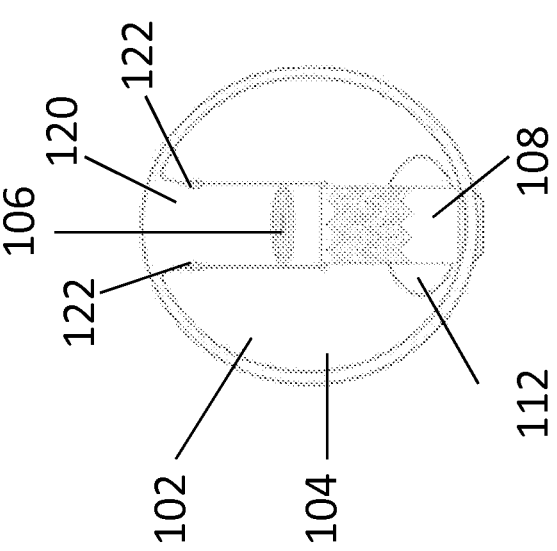

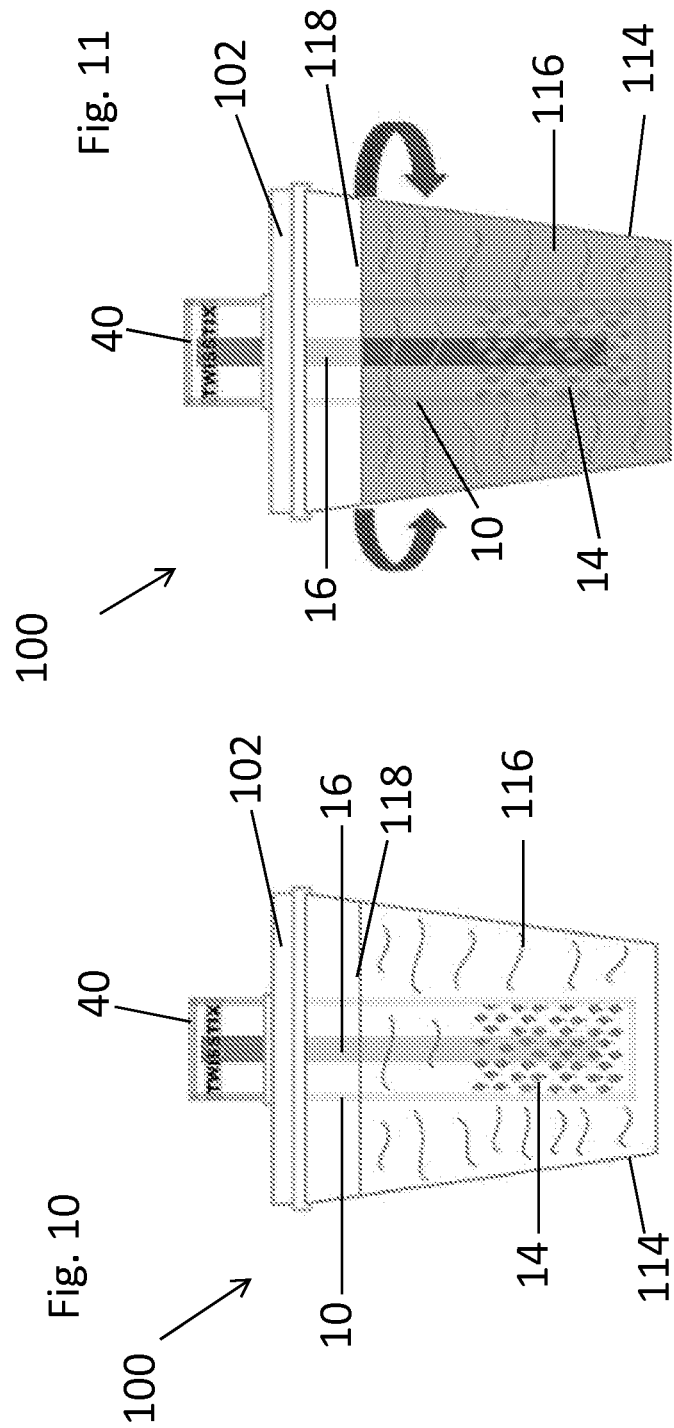

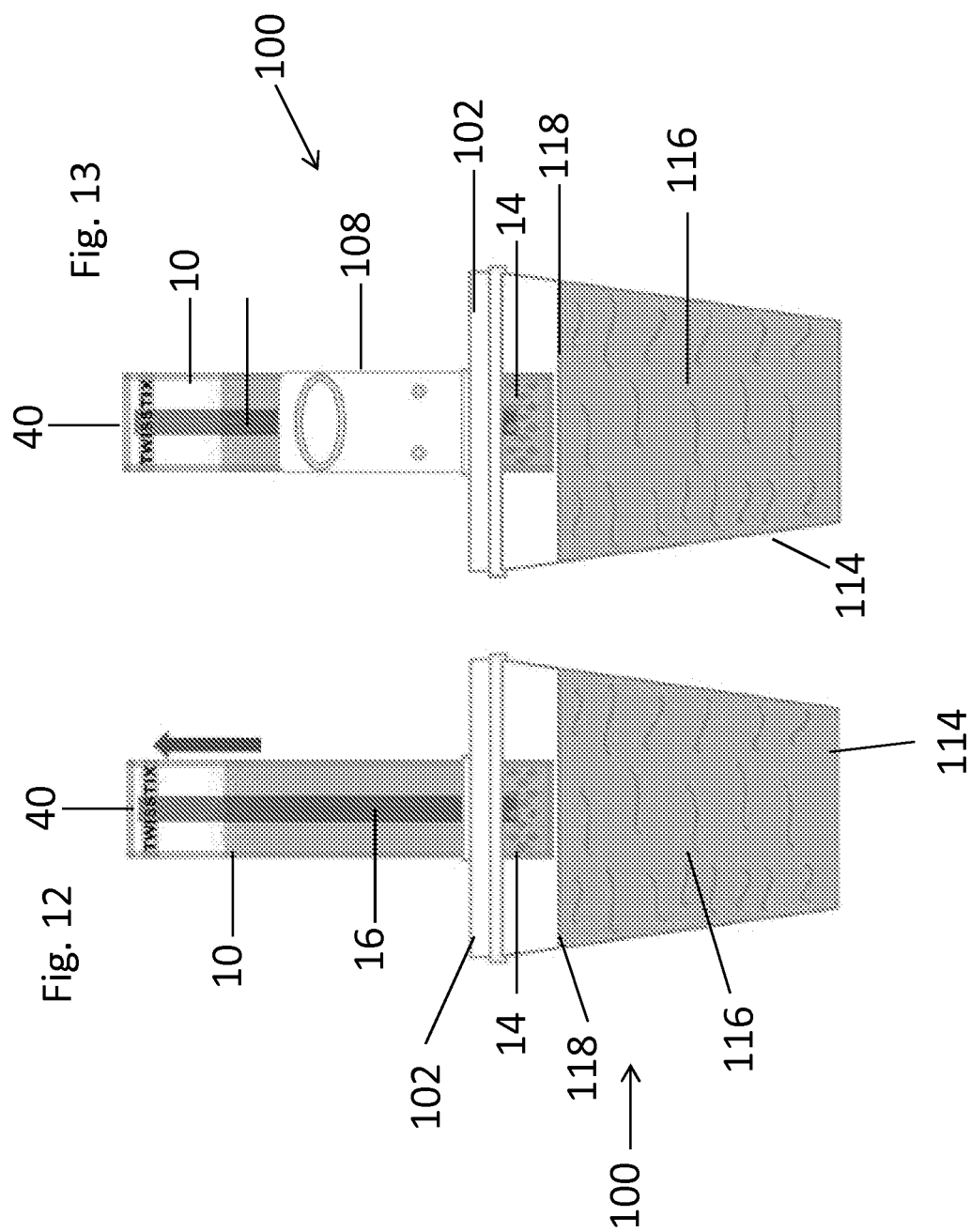

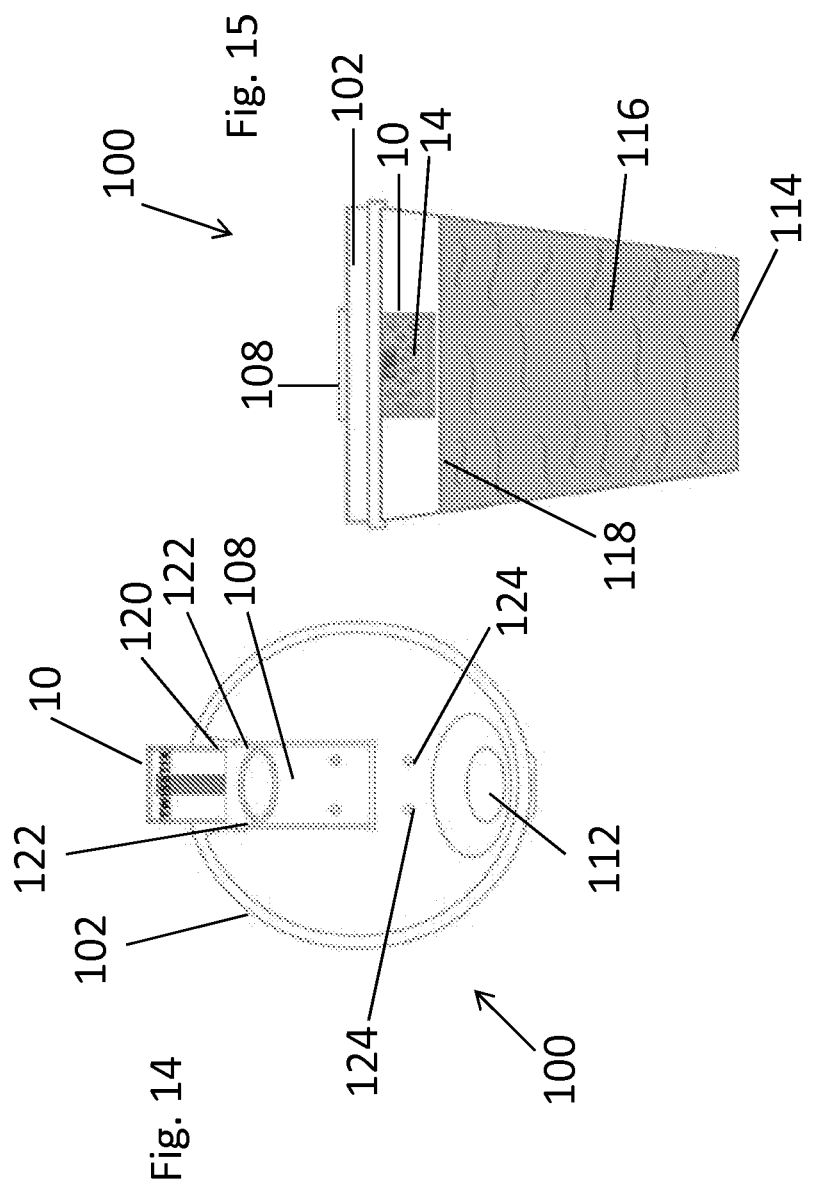

INFUSION PACKAGE AND ASSEMBLY

This application is a National Stage Application of PCT/AU2014/000108, filed 11 Feb. 2014, which claims benefit of Serial No. 2013100144, filed 11 Feb. 2013 in Australia and which applications are incorporated herein by reference. To the extent appropriate, a claim of priority is made to each of the above disclosed applications.

TECHNICAL FIELD

The present disclosure relates to an infusion package and assembly for infusing an infusible material into a liquid, such as infusing tea into hot water. The present disclosure also relates to a method of manufacturing an infusion package.

BACKGROUND ART

Known tea bags are typically made up of a sealed porous bag that holds tea leaves. At the top of the tea bag a thread is stapled. The thread is attached to a tag to allow a user to hold the tag while the tea bag is able to drop into the hot water to infuse the tea away from the user's hand. Traditional tea bags are square or rectangular in shape. More recently, circular or pyramidal shaped tea bags have been sold. Similarly, known coffee infusion bags comprise a square or circular sealed porous bag designed to hold coffee for deposit into hot water to allow the coffee to infuse into the water for consumption.

Whilst the known tea and coffee bags are convenient for infusing the material into a liquid and for making it easy to dispose of the tea leaves and coffee grinds, they are burdened by a number of disadvantages.

For instance, a separate stirrer is required to distribute the infused material evenly throughout the hot water, to increase the infusion rate of the material into the surrounding water, and to dissolve and distribute any separate additives evenly, such as milk, cream, sugar, honey, sweetener or other flavour. In addition, the tea bags usually retain an amount of water which drips creating a mess when the bag is removed from the water.

It is to be understood that, if any prior art publication is referred to herein, such reference does not constitute an admission that the publication forms a part of the common general knowledge in the art, in Australia or any other country.

SUMMARY

In a first aspect, an infusion package is disclosed comprising a permeable membrane defining an elongate cavity to hold an infusible material; and at least one rigid member extending longitudinally along at least a portion of the cavity such that the rigid member is retained by at least a portion of the permeable membrane.

In a second aspect, a method of manufacturing an infusion package is disclosed, the method comprising:
arranging a permeable membrane to define an elongate cavity;
inserting an infusible material into the cavity;
attaching at least one rigid member to the permeable membrane such that the at least one rigid member extends longitudinally along at least a portion of the cavity and is retained by at least a portion of the permeable membrane; and
sealing the permeable membrane to close the cavity.

In a third aspect, a cover for a cup is disclosed comprising a body having an aperture and a retainer, the aperture and the retainer being configured such that an infusion package extending through the aperture may be retained by the retainer in a proximal position in relation to the body.

In a fourth aspect, a cup assembly is disclosed comprising a cup defining an interior container for holding liquid; a cover comprising a retainer for retaining an infusion package above the surface of the liquid.

BRIEF DESCRIPTION OF THE DRAWINGS

Embodiments of the present invention will now be described by way of example only, with reference to the accompanying drawings in which:

FIG. 1 is a side view of a first embodiment of an infusion package according to the present disclosure;

FIG. 1b is a cross-sectional view of an embodiment of a rigid member of the infusion package of FIG. 1;

FIG. 1c is a cross-sectional view of an alternative embodiment of a rigid member of the infusion package of FIG. 1;

FIG. 1d is a cross-sectional view of a further alternative embodiment of a rigid member of the infusion package of FIG. 1;

FIG. 2 is a side view of a second embodiment of an infusion package according to the present disclosure;

FIG. 3a is a side view of a third embodiment of an infusion package according to the present disclosure;

FIG. 3b is a cross-sectional view of the infusion package of FIG. 3a;

FIG. 4a is a side view of a fourth embodiment of an infusion package according to the present disclosure;

FIG. 4b is a cross-sectional view of the infusion package of FIG. 4a;

FIGS. 5a to 5f are side views of a first embodiment of a method of manufacturing an infusion package according to the present disclosure;

FIGS. 6a to 6c are side views of a second embodiment of a method of manufacturing an infusion package according to the present disclosure;

FIGS. 7a to 7c are side views of a third embodiment of a method of manufacturing an infusion packaging according to the present disclosure.

FIG. 8 is a plan view of an embodiment of a cover for a cup according to the present disclosure;

FIG. 9 is a side view of the cover according to FIG. 8;

FIG. 10 is a side view of an embodiment of a cup assembly filled with a liquid and the cover according to FIG. 8;

FIG. 11 is a side view of the cup assembly according to FIG. 10;

FIG. 12 is a side view of the cup assembly according to FIG. 10 illustrating an infusion package in a proximal position to the cover;

FIG. 13 is a side view of the cup assembly according to FIG. 12 illustrating a retainer being moved to an engaged position;

FIG. 14 is a plan view of the infusion assembly according to FIG. 13 illustrating the retainer in the engaged position; and FIG. 15 is a side view of the infusion assembly according to FIG. 13.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilised, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed in some embodiments is an infusion package comprising a permeable membrane defining an elongate cavity to hold an infusible material; and at least one rigid member extending longitudinally along at least a portion of the cavity such that the rigid member is retained by at least a portion of the permeable membrane.

In some embodiments, the at least one rigid member is attached to the membrane.

In some embodiments, the at least one rigid member is located internal the permeable membrane.

In some embodiments, the at least one rigid member is a hollow member.

In some embodiments, the at least one rigid member includes perforations.

In some embodiments, when at least a portion of the infusion package is submerged in a liquid to allow the infusible material to infuse therein, the infusible material expands enhancing the rigidity of the infusion package.

In some embodiments, the at least one rigid member is able to retain at least one additive such that upon submersion in a liquid the additive is released into the liquid.

In some embodiments, the at least one rigid member is impregnated with the at least one additive such that the infusible material and the at least one additive are separated until at least a portion of the infusion package is submerged in the liquid.

In some embodiments, the at least one rigid member comprises a perforated wall defining a cavity to hold the at least one additive such that the infusible material and the at least one additive are separated until at least a portion of the infusion package is submerged in the liquid.

In some embodiments, the infusion package further comprises an actuator arranged to be moveable in relation to the permeable membrane to squeeze the infusion package.

In some embodiments, the actuator may be modified to add branding information.

Disclosed in some embodiments is a method of manufacturing an infusion package, the method comprising:
arranging a permeable membrane to define an elongate cavity;
inserting an infusible material into the cavity;
attaching at least one rigid member to the permeable membrane such that the at least one rigid member extends longitudinally along at least a portion of the cavity and is retained by at least a portion of the permeable membrane; and
sealing the permeable membrane to close the cavity.

Disclosed in some embodiments is a cover for a cup comprising a body having an aperture and a retainer, the aperture and the retainer being configured such that an infusion package extending through the aperture may be retained by the retainer in a proximal position in relation to the body.

In some embodiments, the at least one infusion package is the infusion package according to any one of claims 1 to 11.

In some embodiments, when the infusion package is in the proximal position, the aperture is of a smaller cross section than a portion of the infusion package positioned below the cover.

In some embodiments, the retainer is mounted to the cover via a pivot such that the retainer is arranged to pivot to an engaged position to retain the infusion package in the proximal position.

In some embodiments, in the engaged position, the retainer is in resilient engagement with the cover.

In some embodiments, the cover comprises a recess configured to receive the retainer in the engaged position, and at least one protrusion to resiliently engage the retainer in the engaged position.

Disclosed in some embodiments is a cup assembly comprising a cup defining an interior container for holding liquid; a cover comprising a retainer for retaining an infusion package above the surface of the liquid.

Referring to FIGS. 1a to 4b, illustrative embodiments of an infusion package 10 are shown and will now be described. Like reference numerals will be used for like features.

FIG. 1a illustrates a first embodiment of the infusion package 10. The infusion package 10 generally comprises a permeable membrane 12 composed of paper, fabric or other permeable material, to contain an infusible material 14, and at least one rigid member 16. In the illustrated form the infusible material contained in the package 10 is in leaf or ground form. The infusion package 10 has particular application for use as a tea bag, a coffee bag or the like, but is not limited to that use. For instance, the infusible material 14 may be other plant based infusible material or may be any infusible material. Further the infusible material also include spices, flavours, colours or any suitable material capable of infusion.

The permeable membrane 12 defines an elongate cavity 18 to hold the infusible material 14. In the illustrated form the permeable membrane is folded and sealed at top and bottom ends and along a join of the permeable material to define an interior cavity that is generally rectangular in shape, however the cavity may be of any elongate shape. The elongate shape of the elongate cavity 18 and therefore the infusion package 10 is conducive to being used as a tea bag or coffee bag. In use as a tea or coffee bag, the infusion package 10 is placed in a liquid (e.g., hot water) so that infusion of the infusible material 14 (e.g., tea leaves) occurs in the hot water to produce the desired outcome, that is, for example, a cup of tea. The elongate shape of the package 10 made up by the permeable membrane 12 allows the infusible material 14 to fall to the lower end of the package 10 in use. This allows a user to hold onto one end of the infusion package 10 while submerging the infusible material 14 into the hot water.

The permeable membrane 12 may be formed of any material that allows the infusible material 14 to infuse in use, such as filter paper.

The at least one rigid member 16 extends longitudinally along at least a portion of the elongate cavity 18 such that the at least one rigid member 16 is retained by at least a portion of the permeable membrane 12. In the embodiment illustrated in FIG. 1a, one rigid member 16 is disclosed that extends longitudinally internal the cavity 18 about three quarters of the length of the cavity 18. However in other forms the rigid member may extend for a different distance up to the full length of the internal cavity. In the illustrated form, an end 20 of the rigid member 16 is retained by the membrane 12 via a seal 22 formed at one end of the membrane 12. In alternative embodiments the rigid member is maintained in position through being sealed to other portions of the package.

The rigid member 16 enhances the rigidity of the infusion package 10 to repurpose the infusion package 10 to also be used as a stirrer, thus increasing the functionality of the infusion package 10. Further, when at least a portion of the infusion package 10 is submerged in the liquid to allow the infusible material 14 to infuse therein, the infusible material expands enhancing the rigidity of the infusion package.

The rigid member 16 may take various forms as illustrated in FIGS. 1b to 1d and FIG. 2. In some forms, the rigid member 16 may be formed from wood such as, for example, a popsicle stick or equivalent, cardboard, plastic or any suitable rigid material.

In the form illustrated in FIG. 1b, the rigid member is a hollow member 24 in the form of straw composed of plastic or wood or other appropriate material. The straw allows for a rigid portion for stirring and maintains its form in a hot beverage. In addition, in this embodiment, when the portion of the infusion packaging 10 holding the infusible material 14 is submerged in the liquid, the is infusible material 14 expands. Expansion of the infusible material causes a portion to travel upward into the hollow member 24. This has the result of enhancing the rigidity of the infusion package.

Referring to FIG. 1c, the rigid member is in the form of a formed card or insert or shaped wood or plastic 26 and may either be hollow or solid. Referring to FIG. 1d, the rigid member is in the form of a plastic, cardboard or wooden strip 28.

Referring to FIG. 2, a second embodiment of the infusion package 100 is disclosed in which the rigid member includes perforations 27. In this form the rigid member may be plastic, card or wood and includes perforations to allow movement of liquid or, in some forms, a material through the rigid member 16 either into the interior of the rigid member or to the other side of the rigid member.

In at least one embodiment disclosed in FIGS. 1a to 1d and 2, the rigid member 16, 24, 26, 28 is able to retain at least one additive such that upon submersion in the liquid the additive is released into the liquid. In non-illustrated alternative embodiments, the rigid member 16 shown in FIGS. 1a to 1d may also include perforations as discussed in relation to FIG. 2.

In the embodiments of the rigid member illustrated in FIGS. 1b to 1d, the rigid member 16 may be impregnated with the at least one additive such that the infusible material and the at least one additive are separated until at least a portion of the infusion package is submerged in the liquid. For example, in these embodiments, the additive may be in any suitable form for infusing and may comprise any suitable additive such as flavours, colours, spices or the like.

In the embodiment of the rigid member illustrated in FIG. 2, the rigid member 16 comprises a perforated wall defining a cavity to hold the at least one additive such that the infusible material and the at least one additive are separated until at least a portion of the infusion package is submerged in the liquid. For example, in this embodiment, the additive may be in the form of powders or granules capable of dissolving or infusing such as milk powders, sweeteners, flavours, colours, spices, or the like. Further, in relation to the embodiment of the hollow member 24 disclosed in FIG. 1b, or FIG. 1c where the formed card 26 is hollow, then additive may also be held within the hollow member to be either dissolved or infused.

In alternative embodiments, the hollow perforated rigid member 16 may be impregnated with an additive, such as a caramel flavour, and a further additive may be placed within the hollow of the rigid member, such as cocoa to create a unique flavour combination, such as caramel mocha flavoured rigid member.

In use, the insertion of the rigid member into the hot water acts to infuse the additive into the beverage through hot water permeating the rigid member either through perforations or by permeating permeable material such as card, paper or wood.

Disclosed in FIGS. 3a and 3b is a third embodiment of the infusion package 10. In this embodiment, the rigid member 16 extends longitudinally external the cavity 18 about the length of the infusion package 10. At least one longitudinal edge 32 of the rigid member 16 is retained by the membrane 12 via a seal 34 formed along at least one length (i.e., a vertical seal) of the membrane 12. Vertical seals 34 may also be applied to along both lengths of the rigid member 16. In this regard, the rigid member 16 is able to enhance the rigidity of the infusion package 10 and act as a stirrer whilst not being in contact with the filled product. In this embodiment, the permeable membrane 12 forms a flap or fin 17 to retain the rigid member.

Disclosed in FIGS. 4a and 4b is a fourth embodiment of the infusion package 10 including two rigid members 16 extending longitudinally external the cavity about the length of the infusion package 10. In this embodiment, each rigid member 16 is inserted between longitudinal seals formed proximal to each longitudinal edge 36, 38 of the membrane 12. Again, the rigid member 16 is able to enhance the rigidity of the infusion package 10 and act as a stirrer whilst not being in contact with the filled product.

Some advantages of embodiments of the infusion package according to the present disclosure are as follows:
a) Known traditional tea bags comprise many separate components including filter paper to hold the tea leaves, a thread to hold the tea bag away from the hot water, a staple to attach the thread to the tea bag, a tag to display the tea description and brand, and a spoon for stirring. The infusion package according to the present disclosure is portable, and self-contained in that the rigid member is retained by the infusion package thus rendering the infusion package multipurpose. The rigid member enhances the rigidity of the infusion package to act as a stirrer, and holds the infusion package upright in a vessel to avoid the whole bag (and tag) accidentally being dropped in the liquid making it difficult to retrieve.
b) The infusion package is versatile in application. Various types of infusible material may be held within the infusion package, such as tea leaves, coffee, spices, and flavours etc.
c) The rigid member is versatile in application and may include an additive.
   a. The rigid member may be hollow with or without micro holes, thus allowing the rigid member to also hold contents such as sweeteners, herbs, powders, that will dissolve upon submersion in hot water.
   b. The rigid member may also be solid, where an additive may be impregnated into the rigid member and also released upon submersion in hot water.

Referring now to FIGS. 5a to 7C, illustrative embodiments of a method of manufacturing an infusion package 10 are shown and will be described.

Embodiments of the method of manufacturing of the infusion package 10 according to the present disclosure generally comprise the following steps, which need not necessarily be performed in the listed order.
   a) Arranging a permeable membrane 12 to define an elongate cavity 18.
   b) Inserting an infusible material 14 into the cavity 18.
   c) Attaching at least one rigid member 16 to the permeable membrane 12 such that the at least one rigid member 16 extends longitudinally along at least a portion of the cavity 18 and is retained by at least a portion of the permeable membrane 12.
   d) Sealing the permeable membrane 12 to close the cavity 18 and retain the infusible material within the cavity.

Disclosed in FIGS. 5a to 5f is a first embodiment of the method of manufacturing an infusion package 10 according to the present disclosure. In the illustrated embodiment, FIG. 5a illustrates the step of arranging the permeable membrane 12 to define the elongate cavity 18. In one form, the elongate cavity 18 is in the form of a three sided-bag. The three sided-bag 18 is formed from the permeable material 12 by applying a seal to the longitudinal sides 34 and to one short side 46. Of course, a seal may be applied to any three of the sides and not necessarily the sides illustrated in this embodiment.

Referring to FIG. 5b, the bag 18 is filled with the infusible material 14. The infusible material 14 may be any material as discussed in relation to other embodiments disclosed herein.

Disclosed in FIG. 5c are two alternative embodiments of a rigid member 16 being retained by the permeable member 12. Both rigid members 16 extend longitudinally along at least a portion of the three-sided bag 18. As discussed in relation to other embodiments disclosed herein, the rigid member 16 need not extend the full length of the infusion package 10, may include perforations (as shown in the figure on the left) or without perforations (as shown in the is figure on the right), and may be hollow or solid. The rigid member 16 is also able to retain an additive as discussed above. Once again, the rigid member 16 is inserted in the bag 18 to provide rigidity to the package 10 and to act as a stirrer.

As shown in FIG. 5d, the rigid member 16 is secured in position by attaching the rigid member 16 to the permeable membrane 12 by sealing the end of the rigid member 20 transverse and proximal to the end of the membrane 22. A final seal 48 is then applied to the remaining unsealed side of the membrane 12 (see FIG. 5e).

In addition, illustrated in FIG. 5f, an actuator may be applied to the permeable membrane 12. In the illustrated embodiment, the actuator is in the form of a squeezer or tag 40. The squeezer 40 is arranged to be moveable in relation to the permeable membrane 12 to squeeze the infusion package 10. The squeezer 40 may be modified to add branding information, such as a logo and product details.

In non-illustrated embodiments, once manufactured, the infusion package 10 may be individually flow wrapped or bulk packaged for eventual sale to the consumer to ensure that freshness is maintained.

Referring to FIGS. 6a to 6c, a second embodiment of the method of manufacturing an infusion package 10 is shown. Disclosed in FIG. 6a is the step of providing the permeable material 12.

FIGS. 6b and 6c illustrate forming the elongate cavity 18 whilst attaching the rigid member 16 to the permeable membrane 12. In the illustrated embodiment, the rigid member 16 extends longitudinally external the permeable membrane 12 and is attached to the membrane 12 via vertical seals 34 applied to each length located on either side of the rigid member 16.

Disclosed in FIG. 6b is the step of applying the bottom seal 46 to form a three-sided bag, and then filling the cavity 18 with the infusible material 14. Finally, as shown in FIG. 6c, the top seal 48 is applied to close the infusion package 10.

Referring to FIGS. 7a to 7c, a third embodiment of the method of manufacturing an infusion package 10 is shown. FIG. 7a discloses providing the permeable material 12. FIGS. 7b and 7c illustrate an embodiment where two rigid members 16 are provided. The rigid members 16 extend longitudinally external the cavity 14 but are retained by the permeable membrane proximal to each longitudinal edge 36, 38 of the membrane. Vertical seals 34 are formed with the permeable membrane 12 on either side of each rigid member 16. Then, the bottom seal 46 is applied, and the cavity 18 is filled with the infusible material 14. Finally, the top seal 48 is applied to close the infusion package 10.

Referring now to FIGS. 8 to 15, a cover 102 for a cup assembly 100, and the cup assembly 100 are illustrated. The cover 102 and cup assembly 100 may be disposable or reusable. In addition, embodiments of the cover 102 are designed to fit on standard cups (either disposable or reusable) and are capable of being sold individually from the cup assembly.

Referring to FIG. 8, a plan view of the cover 102 is shown. The cover 102 generally includes a cover body 104 having an aperture 106 positioned in the cover body. In the illustrated form the aperture 106 is positioned centrally in the cover body although the aperture may reasonably be positioned toward an edge of the cover. The cover further include a retainer 108 which is positioned adjacent the aperture.

The aperture is positioned and shaped to allow an infusion package such as that previously described to extend through the aperture. The retainer 108 is configured such that an infusion package 10 extending through the aperture 106 may be retained by the retainer 108 in relation to the body 104. Numerous suitable infusion packages may be used in combination with the illustrated cup assembly, and it should be understood the cover and cup assembly are not limited to use with the embodiments of the infusion package discussed herein. The retainer 108 may act to clip the infusion package in a particular orientation with respect to the cover.

In the illustrated embodiment, the aperture 106 is located generally in the centre of the cover 104, and as shown best in FIG. 9 is of a sufficient cross section to receive a portion of the infusion package 10. In particular, the infusion package 10 extends through the aperture to allow infusible material 14 to be positioned below the cover 102 (as shown in the position illustrated in FIG. 9) and the squeezer or tag 40 to be positioned above the cover 102 (as shown in the position illustrated in FIG. 9).

Also disclosed in FIG. 8 is the retainer 108. The retainer 108 is hingedly mounted to the cover 102 via a pivot 110 such that the retainer 108 is arranged to pivot from the illustrated unengaged position to an engaged position. In the illustrated embodiment, the unengaged position is shown as partly covering the sip hole 112. It should be appreciated that the unengaged position may be any location about the circumference of the cover 102 where the infusion package 10 is able to be inserted into the aperture 106, as shown in FIG. 9.

In the engaged position, which will be discussed in more detail below, the retainer 108 is pivoted from the unengaged position to a position located opposite the unengaged position. In the illustrated embodiment, there is approximately 180° between the unengaged and engaged positions about the circumference of the cover 102 and the retainer 108 does not cover the sip hole 112. Although in this embodiment the retainer is mounted to the cover via a pivot, any suitable joint between the retainer and cover may be used. For instance, a ball joint may also be used to enable the retainer to move from an unengaged to an engaged position. In these circumstances, the unengaged and the engaged position may be located at any angle from one another, such as 90°.

Now referring to FIG. 10, the cover 102 and infusion package 10 are located on a cup 114. The cup 114 defines an interior container for holding liquid 116 and the cover 102 is secured on the cup 114. In the illustrated embodiment, the liquid 116 is in the form of hot water. Next, the infusion package 10 is swirled around inside the cup to encourage the infusible material 14 to infuse in the hot water 116. The cover 102 remains securely fastened to the cup 114 throughout the use of the cup assembly 100. As the sip hole 112 is only partly covered, sips of the beverage may be taken to ensure desired strength and infusion of infusion package 10.

Once the desired strength is reached, the squeezer/tag 40 is pulled up until the infusion package 10 reaches a proximal position. In the illustrated embodiment, the proximal position is where the infusion package 10 is positioned below the cover 102 and above a surface 118 of the liquid 116. The proximal position may be any position where the infusion package 10 is pulled up so it is located proximal the cover 102. Depending on the level of the liquid 116 and how close the infusion package 10 is in relation to the cover 102, the infusion package 10 may or may not be above the surface of the liquid 116.

In at least one embodiment, it is advantageous for the infusion package 10 to be above the surface of the liquid 116 in the proximal position so that the strength of the beverage is maintained. Where the infusion package 10 remains below the surface of the liquid 16 in the proximal position, the strength of the beverage will continue to increase until the level of the liquid is reduced through consumption.

Further, when the infusion package is in the proximal position, the aperture 106 is of a smaller cross section than a portion of the infusion package 10 positioned below the cover 102. The portion of the infusion package which is generally of larger cross section than the aperture is the portion which contains the infusible material 14 by gravity. This portion will stop the infusion package 10 from being totally withdrawn from the cover 102 without removal of the cover 102 from the cup 114.

Referring to FIG. 13, the retainer 108 is illustrated in between the unengaged and the engaged positions. In other words, the retainer 108 is flipped or pivoted to the engaged position from the unengaged position.

Disclosed in FIGS. 14 and 15 the retainer 108 in the engaged position where the retainer 108 is able to retain the infusion package 10 in the proximal position. The sip hole 122 is wholly exposed, along with two air holes 124 to promote the flow of liquid 116 during each sip.

Also in the engaged position, the retainer 108 is in resilient engagement with the cover 102. In this regard, the cover 102 includes a recess 120 configured to receive the retainer 108, and at least one protrusion 122 to resiliently engage the retainer. In the illustrated embodiment, the cover 120 includes two protrusions 122 that are configured such that the retainer 108 is in a snap fit arrangement with the protrusions 122. The retainer may be in any suitable fit arrangement where the retainer is able to be secured in the engaged position, and releasable to be free to move to the unengaged position. For example, interference fit between the retainer and the cover may also be appropriate.

Once both the infusion package 10 is located in the proximal position and the retainer is in the engaged position, the cup assembly 100 containing the choice beverage is ready to consume with both the cover 102 and the infusion package 10 still attached. Accordingly, with the cover and infusion package still attached no mess has been made by disposing of a dripping infusion package or through spilling the contents of the cup 102. If disposable, the whole cup assembly 100 may be disposed of after the beverage has been consumed. This is beneficial for travellers and airlines and avoids mess.

In at least one embodiment, the cover 102 disclosed according to the present is disclosure is advantageous as it is suitable for the take away market. First, the cover 102 may be disposable. Second, the cover 102 and infusion package 10 arrangement allow the user to mix the infusible material to the desired strength, and then lift the infusion material 14 above the surface of the liquid 116. When infusible material is tea, this feature minimises unwanted increased tea strength or the tea from going bitter if the infusible material were left in the water. Third, whilst being lifted the infusible material 14 may be pressed up against the cover 102 to act as a squeezer.

In the claims which follow and in the preceding disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the present disclosure.

Accordingly, the present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An infusion package extending longitudinally between an upper package end and a lower package end, the infusion package comprising:

a permeable membrane folded longitudinally and being folded and sealed to itself at the upper package end and at the lower package end and along a longitudinal edge of the permeable membrane to form a folded and sealed porous bag that is elongate and rectangular in shape, the folded and sealed porous bag defining an elongate cavity and being configured to hold an infusible material such that in use the infusible material falls within the folded and sealed porous bag and fills the lower package end of the infusion package; a single elongate rigid strip extending longitudinally from a first upper strip end to a second lower strip end located entirely inside the elongate cavity such that the single elongate rigid strip is retained within the permeable membrane.

2. The infusion package as defined in claim 1, wherein the single elongate rigid strip is composed of a material that is impregnated with an additive such that on immersion the additive is dispersed into a fluid.

3. The infusion package according to claim 2, wherein the infusible material and the additive are separated until immersion of at least a portion of the infusion package in the fluid and wherein upon immersion the additive is dispersed in the fluid by the fluid acting on the single elongate rigid strip.

4. The infusion package as defined in claim 1 further comprising an actuator arranged to be moveable in relation to the permeable membrane to squeeze the infusion package.

5. The infusion package according to claim 4, wherein the actuator may be modified to add branding information.

6. The infusion package according to claim 4 wherein the actuator is composed of a non-permeable material.

7. An infusion package extending longitudinally between an upper package end and a lower package end, the infusion package comprising:

a permeable membrane folded longitudinally and being folded and sealed at the upper package end and the lower package end and along a longitudinal edge of the permeable membrane to form a folded and sealed porous bag that is elongate and rectangular in shape, the folded and sealed porous bag defining an elongate cavity and being configured to hold an infusible material such that in use the infusible material falls within the folded and sealed porous bag and fills the lower package end of the infusion package; a single elongate rigid strip having a first strip end and a second strip end located entirely inside the elongate cavity and extending longitudinally from the upper package end to the lower package end such that the single elongate rigid strip is retained by the permeable membrane and holds the infusion package upright in a vessel, and wherein the single elongate rigid strip terminates above a lower end of the elongate cavity such that at least some of the infusible material is disposed between a lower end of the single elongate rigid strip and the lower end of the elongate cavity; and at least one seal formed in the permeable membrane for retaining the single elongate rigid strip within the permeable membrane.

8. The infusion package of claim 7, wherein the at least one seal is disposed longitudinally along a length of the single elongate rigid strip.

9. The infusion package of claim 7, wherein the at least one seal is disposed across a width of the single elongate rigid strip.

10. The infusion package of claim 7 wherein the first strip end of the single elongate rigid strip and the second strip end of the single elongate rigid strip are identical to one another in shape.

* * * * *